United States Patent [19]

Hater et al.

[11] 4,300,939

[45] Nov. 17, 1981

[54] METHOD OF PROCESSING WASTE SLUDGE FROM WET PHOSPHORIC ACID PURIFICATION ACID PURIFICATION FACILITIES

[75] Inventors: Martin Hater; Fritz Meininghaus, both of Dortmund; Rudiger Scheel, Schwerte, all of Fed. Rep. of Germany

[73] Assignee: Uhde GmbH, Fed. Rep. of Germany

[21] Appl. No.: 164,698

[22] Filed: Jun. 30, 1980

[30] Foreign Application Priority Data

Jun. 30, 1979 [DE] Fed. Rep. of Germany ....... 2854433

[51] Int. Cl.[3] ............................................. C05B 21/00

[52] U.S. Cl. ............................................ 71/25; 71/33; 210/751; 210/907

[58] Field of Search ........................ 71/25, 33, 64 DC; 210/702, 705, 713, 723, 749, 919

[56] References Cited

U.S. PATENT DOCUMENTS

| | | | |
|---|---|---|---|
| 2,983,544 | 5/1961 | Jost | 71/25 X |
| 3,235,595 | 6/1964 | Williams | 71/25 |
| 3,579,321 | 5/1971 | Staller | 71/25 |
| 3,756,119 | 5/1973 | Davidtz | 210/47 |
| 3,763,041 | 10/1973 | Cook et al. | 210/42 R |
| 4,257,898 | 3/1981 | Meurer et al. | 210/751 |

FOREIGN PATENT DOCUMENTS

| | | | |
|---|---|---|---|
| 51-62557 | 5/1976 | Japan | 210/51 |

*Primary Examiner*—S. Leon Bashore
*Assistant Examiner*—F. H. Lander
*Attorney, Agent, or Firm*—Wilson, Fraser, Barker & Clemens

[57] ABSTRACT

A method for processing waste sludge from wet phosphoric acid purification facilities wherein steelworks slag is separately ground, the ground slag then is force-mixed and granulated together with the waste sludge.

10 Claims, No Drawings

METHOD OF PROCESSING WASTE SLUDGE FROM WET PHOSPHORIC ACID PURIFICATION ACID PURIFICATION FACILITIES

BACKGROUND OF THE INVENTION

The dumping of this sludge presents considerable problems. For instance, the readily water-soluble alkalibound phosphates are washed out by rain and this will ultimately result in heavy eutrophication of the local surface water. At the same time, certain portions of the other sludge constituents are also washed out. In a wet phosphoric acid purification unit with an annular throughput of approximately 100,000 tons $H_3PO_4$, the quantity of sludge obtained per year will be about 50,000 tons. According to the present state of engineering technology, there is no alternative but to dump this sludge. The cost of such a temporary dump is mainly determined by the land required, plastic film covering and/or lining and by the inspection requirements to ensure that the ground water is not polluted. A final solution to the problem cannot be foreseen at present.

A copending patent application Ser. No. 099,530 now U.S. Pat. No. 4,257,898, Mar. 24, 1981, relates to a method for processing the waste sludge obtained in purification facilities for phosphoric acid produced by the wet process into a $P_2O_5$- bearing fertilizer. The processing method comprises the addition of controlled quantities of the waste sludge to steelwords slag, such that the dry mixture has a $P_2O_5$- content of 3-9%. Further embodiments of this method provide for admixing the waste sludge at a uniform rate to the warm prepared slag or for spreading it fairly uniformly over a hot slag bed.

Whereas the method according to the copending patent application is distinguished by its simplicity, economy and non-polluting properties, it is nevertheless capable of improvement, on the one hand with regard to the high moisture content of the sludge and the resulting difficulties in its handling as well as the tendency to form lumps and incrustation and, on the other hand, with regard to the properties of the end product, while not using any additives, in particular solid or liquid binders, which would render the entire process more costly.

SUMMARY OF THE INVENTION

The improvement according to the invention comprises separate grinding of the steelworks slag, the ground slag then being force-mixed and granulated together with the waste sludge. The preferred mixing ratios are 70–85, preferably 75–80, parts of ground steelworks slag to 30–15, preferably 25–20, parts of waste sludge containing 50–60% water; these are mixed and granulated, and the granulated mixture is subsequently dried to a residual moisture content of 2–5%, preferably 3–4%. This procedure yields a fine-grained product, the preferred grain size being 0.3 to 2 mm diameter, with a citrate-soluble $P_2O_5$ content of 3.5 to 6%. The above-mentioned mixing ratio and water content of the sludge results in the granulate being considerably solidified during the drying process to a residual moisture content of 3 to 4%. The admixing of binders that are otherwise commonly used, such as waste sulphide liquor, molasses, etc., is thus unnecessary. As a result of the strength of the granules, only a small quantity of abrasion is produced when the granulated product is handled, and the formation of lumps is precluded.

The particular advantage achieved by the invention is the fact that the product is an easily spreadable fine-grained lime fertilizer that does not tend to form dust, which is rich in phosphorus and which is enriched with citrate-soluble $P_2O_5$ to the required extent, namely 3.5 to 6%.

Tests have confirmed that the fertilizing effect of the lime fertilizer produced by the method according to the invention is comparable to that obtained with powdery fertilizer. The profitability of producing the granulate is due to the low cost of crushed slag and waste sludge, since no other feedstocks are required.

To perform the granulation required for the method according to the invention all types of granulating facilities can be used that are capable of thoroughly mixing the clay-like waste sludge with the ground steelworks slag, if necessary with the aid of additional crushing or kneading tools. Mixers of this type are known as countercurrent intensive mixers with cutter-type rotors or double shaft granulators. The subsequent drying is effected in a drying drum or in a fluidized bed drier. The advantage of using a drum type drier is that the granulate is simultaneously stabilized and any adhering particles are separated.

An alternative method provides for mixing the waste sludge with only part of the required steelworks slag in ground form, the remainder being added in lumpy form. In this way, the wet sludge is first converted to a semi-dry intermediate product that no longer tends to form lumps and which is easier to convey and otherwise to handle. The size reduction and homogenization of the slag and pre-dried sludge subsequently takes place by further grinding the mixture in a mill, in which the moisture still contained in the material is expelled to the required extent by heating the mill, a considerable portion of the thermal energy being produced by the grinding process itself. In a further embodiment of this alternative, part of the ready-ground mixture is recycled and re-admixed to the waste sludge.

DESCRIPTION OF THE PREFERRED EMBODIMENT

The method according to the invention is described in more detail in the following examples:

EXAMPLE 1

Steelworks slag containing 1.3% citric-acid-soluble $P_2O_5$ is ground to a grain size of 80% smaller than 0.16 mm diameter. The ground slag is temporarily stored in a bin. Phosphatic waste sludge with a soluble $P_2O_5$ content of 25% in the dry substance and a moisture content of 55% is stored in a second bin. The two components are continuously withdrawn from the respective bins, the slag by a belt-type production weigher, the phosphatic waste sludge by screw conveyers, in a ratio of 5 parts of slag to 1 part of sludge and fed into a force-mixer, e.g. a countercurrent intensive mixer with additional cutters. The material passes through the mixer with a total residence time of 4 minutes and leaves the mixer in the form of a fine-grained grannular. The 0.3 to 2 mm grain size fraction is 83%, the moisture content 11%. In a downstream drying drum the granulate is further dried to a residual moisture content of 3%. After drying, the grain size fraction of 0.3 to 2 mm amounts to 78%. The fines, i.e. the particles smaller than 0.3 mm diameter, are screened off and recycled into the process, i.e. they are admixed to the waste sludge and ground slag. The product fertilizer granulate contains about 4.1% citric-acid-soluble phosphoric acid, has a good abrasion resistance and can be spread without any dust formation.

EXAMPLE 2

In a countercurrent intensive mixer, 4700 kg/h waste sludge containing 25% $P_2O_5$ in the dry substance and 55% moisture and 3200 kg/h recycled fertilizer fines are jointly processed, thus yielding a crumbly intermediate product with a moisture content of about 32%. This intermediate product is fed together with 14,800 kg/h lumpy LD steelworks slag at a uniform rate into a grinding/drying unit. The LD steelworks slag contains 1.2% $P_2O_5$. The finished product is a fertilizer with 4.1% $P_2O_5$ (soluble). The quantity produced is approximately 20 t/h, of which 3200 kg are recycled, i.e. this quantity is re-admixed to unprocessed waste sludge.

We claim:

1. A method of converting waste sludge of substantially no utility from wet phosphoric acid purification, having a relatively high, water-soluble phosphatic content to a useful fertilizer, said method comprising grinding steelworks slag having a relatively low phosphatic content, contacting said sludge with said ground slag, forming a fertilizer admixture from said sludge and slag having an averaged phosphatic content depending on the relative proportions or sludge and slag used.

2. The method of claim 1 wherein said admixture of sludge and slag has a phosphatic content in the range of about 3% to about 9% $P_2O_5$ by weight.

3. The method of claim 1 wherein 70–85 parts of ground steelworks slag is contacted with 15–30 parts of waste sludge, said waste sludge having a moisture content of 50–60%.

4. The method of claim 1 wherein 70–80 parts of ground steelworks slag is contacted with 20–25 parts of waste sludge, said waste sludge having a moisture content of 50–60%.

5. The method of claim 3, further comprising the step of granulating said admixture of sludge and slag without any additives or binders to a grain size of 0.3 to 2 mm in diameter.

6. The method of claim 5, further comprising the step of drying the granulated mixture to a residual moisture content of 2–5%.

7. The method of claim 6 wherein the granulated mixture is dried to a residual moisture content of 3–4%.

8. A method of converting waste sludge of substantially no utility from wet phosphoric acid purification having a relatively high water-soluble phosphatic content to a useful fertilizer, said method comprising grinding a portion of steelworks slag having a relatively low phosphatic content, contacting said sludge with said ground slag and lumpy unground steelworks slag, forming a fertilizer admixture from said sludge and slag having an averaged phosphatic content depending on the relative proportions of sludge and slag used.

9. The method of claim 8, further comprising the step of simultaneously grinding and drying the mixture of said sludge and said ground slag and said unground slag.

10. The method of claims 1, 2, 3, 4, 5, 6, 7, 8, or 9 wherein a portion of the ground mixture is recycled and re-admixed to said waste sludge.

* * * * *

UNITED STATES PATENT AND TRADEMARK OFFICE
CERTIFICATE OF CORRECTION

PATENT NO. : 4,300,939

DATED : November 17, 1981

INVENTOR(S) : Gerhard Link, Dr. Josef Riedel, Dr. Walter Frohlich

It is certified that error appears in the above—identified patent and that said Letters Patent is hereby corrected as shown below:

On the Title page , the assignee should read as follows:

--UHDE GmbH, Fed. Rep. of Germany--.

Signed and Sealed this

*Nineteenth* Day of *October 1982*

[SEAL]

*Attest:*

GERALD J. MOSSINGHOFF

*Attesting Officer* *Commissioner of Patents and Trademarks*